(12) United States Patent
Wu

(10) Patent No.: US 9,075,489 B2
(45) Date of Patent: Jul. 7, 2015

(54) METHOD FOR MAKING TOUCH PANEL

(71) Applicant: TIANJIN FUNAYUANCHUANG TECHNOLOGY CO., LTD., Tianjin (CN)

(72) Inventor: Ho-Chien Wu, New Taipei (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 14/101,788

(22) Filed: Dec. 10, 2013

(65) Prior Publication Data

US 2015/0060391 A1    Mar. 5, 2015

(30) Foreign Application Priority Data

Sep. 2, 2013 (CN) .......................... 2013 1 0389688

(51) Int. Cl.
  *H01B 13/00* (2006.01)
  *B44C 1/22* (2006.01)
  *G06F 3/044* (2006.01)
  *B82Y 30/00* (2011.01)

(52) U.S. Cl.
  CPC ................ *G06F 3/044* (2013.01); *B82Y 30/00* (2013.01)

(58) Field of Classification Search
  CPC ........... G06F 1/16; G06F 3/044; G06F 3/045; G06F 2203/04103; F06F 3/041; B82Y 10/00
  USPC ................ 216/13, 41, 65; 977/742, 953, 956; 345/173, 176
  See application file for complete search history.

(56) References Cited

U.S. PATENT DOCUMENTS

| | | | | |
|---|---|---|---|---|
| 2009/0159188 A1* | 6/2009 | Jiang et al. | ..................... | 156/235 |
| 2012/0313864 A1* | 12/2012 | Cheng et al. | ................... | 345/173 |
| 2013/0027799 A1* | 1/2013 | Hsu et al. | ........................ | 359/885 |
| 2013/0147740 A1* | 6/2013 | Wang et al. | .................... | 345/173 |
| 2013/0285970 A1* | 10/2013 | Ahn et al. | ....................... | 345/173 |
| 2014/0145980 A1* | 5/2014 | Feng et al. | ..................... | 345/173 |

* cited by examiner

*Primary Examiner* — Shamim Ahmed
(74) *Attorney, Agent, or Firm* — Novak Druce Connolly Bove + Quigg LLP

(57) ABSTRACT

A method for making a touch panel is provided. A number of first transparent conductive layers are formed on an insulative substrate. Each of the first transparent conductive layers is resistance anisotropy. An adhesive layer is formed on the insulative substrate to cover only part of the first transparent conductive layers. A carbon nanotube layer is formed on the adhesive layer. The carbon nanotube layer is patterned to obtain a number of second transparent conductive layers spaced from each other and with each corresponding to one first transparent conductive layer. A number of first electrodes, a first conductive trace, a number of second electrodes, and a second conductive trace are formed contemporaneously.

20 Claims, 7 Drawing Sheets

METHOD FOR MAKING TOUCH PANEL

This application claims all benefits accruing under 35 U.S.C. §119 from China Patent Applications: Application No. 201310389688.2, filed on Sep. 2, 2013, in the China Intellectual Property Office, disclosures of which are incorporated herein by references.

BACKGROUND

1. Technical Field

The present disclosure relates touch panels and method for making the same, particularly to a carbon nanotube based capacitance-type touch panel and method for making the same.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Thus a demand exists for such touch panels which superior in visibility and reliable in operation. Different types of touch panels, including a resistance-type, a capacitance-type, an infrared-type and a surface sound wave-type have been developed.

A conventional capacitance-type touch panel usually includes a first transparent conductive layer, an insulative substrate, and a second transparent conductive layer stacked with each other in that order. That is, the first transparent conductive layer and the second transparent conductive layer are located on opposite two surfaces of the insulative substrate. However, the insulative substrate is usually a glass plate or polymer plate with a relative high thickness, which cannot meet the requirement of lightweight and small thickness of electronic device development. Furthermore, in making process, it is difficult to form the first transparent conductive layer and the second transparent conductive layer on the same insulative substrate directly. Usually, the first transparent conductive layer and the second transparent conductive layer are formed on two different insulative substrates, and then the two different insulative substrates are bound together by an optically clear adhesive (OCA), however, the thickness of the touch panel is further increased.

What is needed, therefore, is to provide a touch panel and method for making the same which can overcome the short come described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the carbon nanotube based capacitance-type touch panel and method for making the same.

Figure 1:
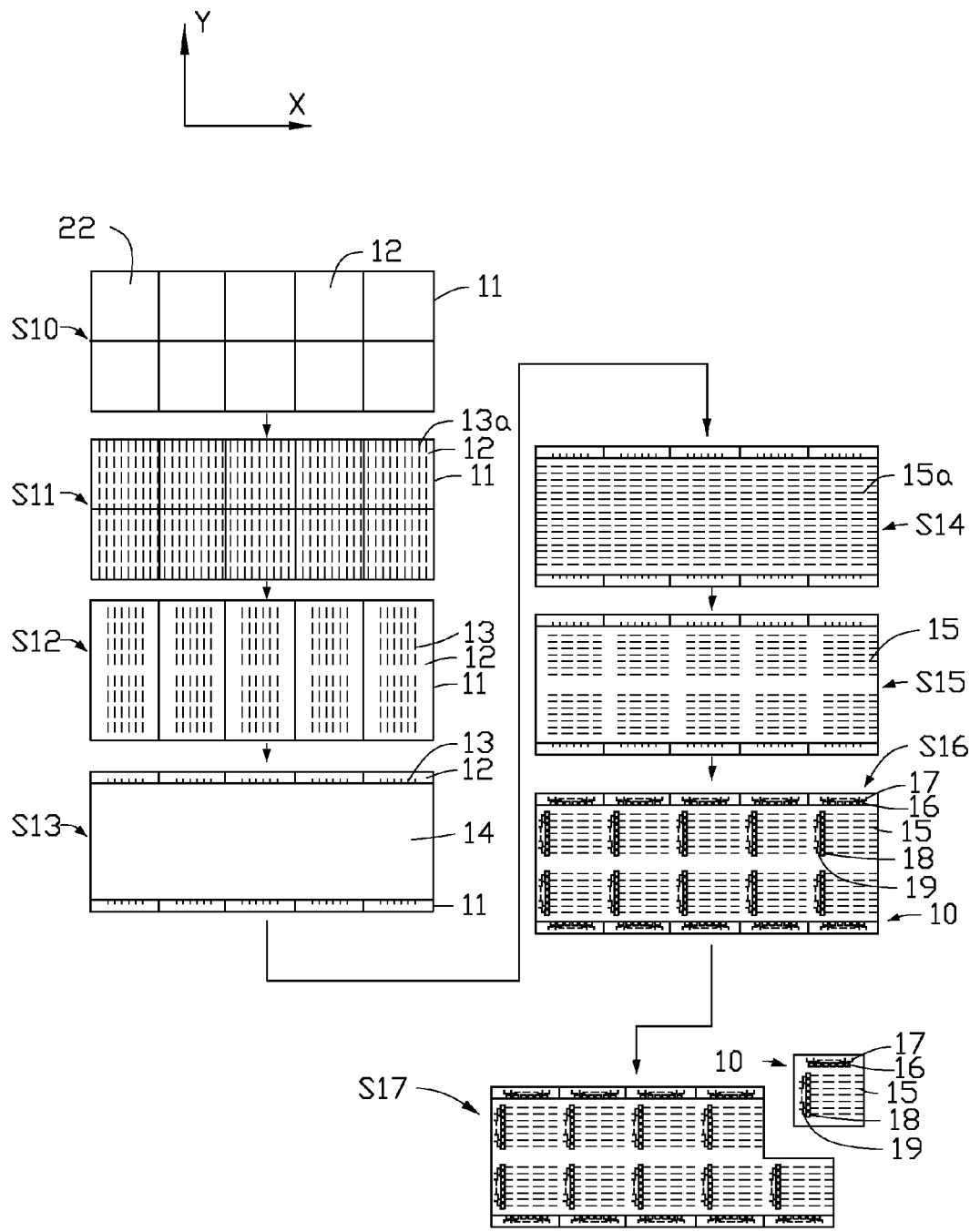
FIG. 1 is a flow chart of one embodiment of a method for making a touch panel.

Referring to FIG. 1, a method of one embodiment for making the touch panels 10 comprises following steps:

step (S10), forming a first adhesive layer 12 on a surface of an insulative substrate 11;

step (S11), forming a first carbon nanotube layer 13a on a surface of the first adhesive layer 12;

step (S12), patterning the first carbon nanotube layer 13a to obtain a plurality of first transparent conductive layers 13 spaced from each other;

step (S13), forming a second adhesive layer 14 on the first adhesive layer 12 to cover only part of each of the plurality of first transparent conductive layers 13 so that each of the plurality of first transparent conductive layers 13 has at least part exposed;

step (S14), forming a second carbon nanotube layer 15a on a surface of the second adhesive layer 14;

step (S15), patterning the second carbon nanotube layer 15a to obtain a plurality of second transparent conductive layers 15 spaced from each other and with each corresponding to one of the plurality of first transparent conductive layers 13; and step (S16), forming a plurality of first electrodes 16 and a first conductive trace 17 corresponding to each of the plurality of first transparent conductive layers 13; and forming a plurality of second electrode 18 and a second conductive trace 19 corresponding to each of the plurality of second transparent conductive layers 15 contemporaneously.

In step (S10), the insulative substrate 11 can be flat or curved and configured to support other elements. The insulative substrate 11 can be transparent or opaque. The size and shape of the insulative substrate 11 can be selected according to need. In one embodiment, the thickness of the insulative substrate 11 is in a range from about 100 micrometers to about 500 micrometers. The insulative substrate 11 can be made of rigid materials such as glass, quartz, diamond, plastic or any other suitable material. The insulative substrate 11 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), polyesters, or acrylic resin. In one embodiment, the insulative substrate 11 is a flat PET plate with a thickness of 150 micrometers.

The first adhesive layer 12 can be formed by spin-coating, spraying, or brushing. The shape and size of the first adhesive layer 12 can be the same or different from the shape and size of the insulative substrate 11. The first adhesive layer 12 is used to fix the first carbon nanotube layer 13a on the insulative substrate 11. The thickness of the first adhesive layer 12 can be in a range from about 10 nanometers to about 10 micrometers, for example, from about 1 micrometer to about 2 micrometers. The first adhesive layer 12 can be transparent or opaque. The first adhesive layer 12 can be made of materials such as thermal plastic glue, thermosetting glue or UV (Ultraviolet Ray) glue, for example PVC or PMMA. In one embodiment, the insulative substrate 11 is a flat and flexible PET plate with a thickness of 150 micrometers, and a UV glue layer with a thickness of 1.5 micrometers is formed on entire surface of the insulative substrate 11 by spin-coating.

Figure 2:
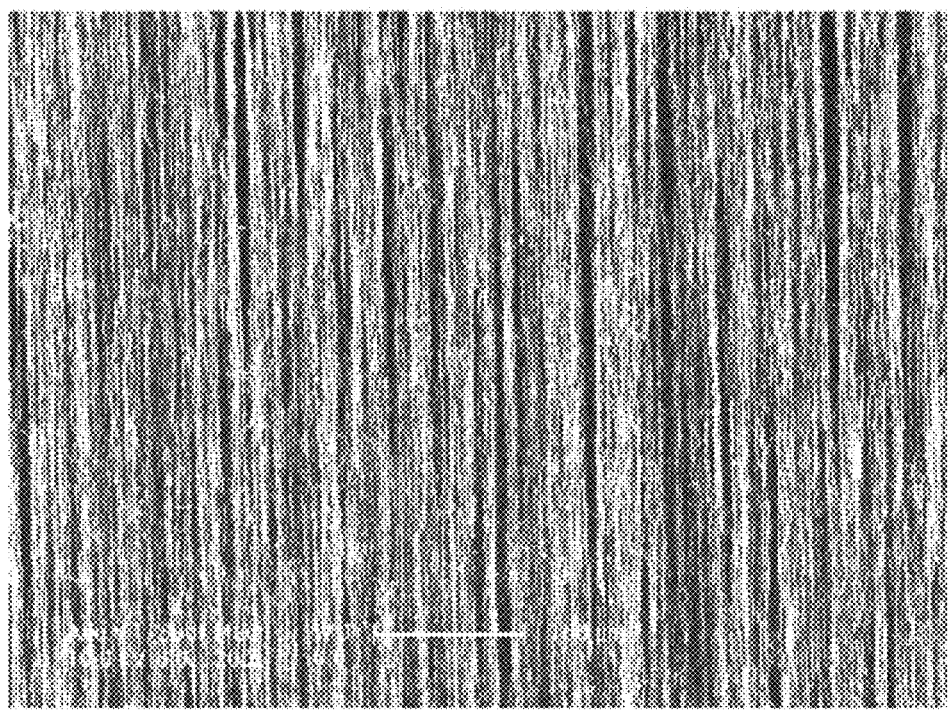
FIG. 2 is a Scanning Electron Microscope (SEM) image of a carbon nanotube film.

In step (S11), the first carbon nanotube layer 13a is a free-standing carbon nanotube film with resistance anisotropy. Referring to FIG. 2, the carbon nanotube film is a substantially pure structure consisting of a plurality of carbon nanotubes, with few impurities and chemical functional groups. The carbon nanotube film is a free-standing structure. The term "free-standing structure" includes, but is not limited to, the property that the carbon nanotube film can sustain the weight of itself when it is hoisted by a portion thereof without any significant damage to its structural integrity. Thus, the carbon nanotube film can be suspended by two spaced supports. The majority of carbon nanotubes of the carbon nanotube film are joined end-to-end by van der Waals force therebetween so that the carbon nanotube film is a free-standing structure. The carbon nanotubes of the carbon nanotube film can be single-walled, double-walled, or multi-walled carbon nanotubes. The diameter of the single-walled carbon nanotubes can be in about 0.5 nm to about 50 nm. The diameter of the double-walled carbon nanotubes can be in about 1.0 nm to about 50 nm. The diameter of the multi-walled carbon nanotubes can be in about 1.5 nm to about 50 nm.

The carbon nanotubes of the carbon nanotube film are oriented along a preferred orientation. That is, the majority of carbon nanotubes of the carbon nanotube film are arranged to substantially extend along the same direction and in parallel with the surface of the carbon nanotube film. Each adjacent two of the majority of carbon nanotubes of the carbon nanotube film are joined end-to-end by van der Waals force therebetween along the extending direction. A minority of dispersed carbon nanotubes of the carbon nanotube film may be located and arranged randomly. However, the minority of dispersed carbon nanotubes have little effect on the properties of the carbon nanotube film and the arrangement of the majority of carbon nanotubes of the carbon nanotube film. The majority of carbon nanotubes of the carbon nanotube film are not absolutely form a direct line and extend along the axial direction, some of them may be curved and in contact with each other in microcosm. Some variations can occur in the carbon nanotube film. Because the electric conductivity of the carbon nanotubes along the axial direction is much better than the electric conductivity along the radial direction, and the majority of the carbon nanotubes of the carbon nanotube film are substantially arranged to extend along the same direction, the carbon nanotube film is conductivity anisotropy.

The carbon nanotube film can be made by the steps of: growing a carbon nanotube array on a wafer by chemical vapor deposition (CVD) method; and drawing the carbon nanotubes of the carbon nanotube array to from the carbon nanotube film. During the drawing step, the carbon nanotubes are joined end-to-end by van der Waals attractive force therebetween along the drawing direction. The carbon nanotube film has the smallest resistance along the drawing direction and the greatest resistance along a direction perpendicular to the drawing direction. Thus, the carbon nanotube film is resistance anisotropy. Furthermore, the carbon nanotube film can be etched or irradiated by laser. After being irradiated by laser, a plurality of parallel carbon nanotube conductive strings will be formed and the resistance anisotropy of the carbon nanotube film will not be damaged because the carbon nanotube substantially extending not along the drawing direction are removed by burning. Each carbon nanotube conductive string comprises a plurality of carbon nanotubes joined end-to-end by van der Waals attractive force.

In one embodiment, the carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. The carbon nanotubes in the carbon nanotube film are oriented along a preferred orientation.

The free-standing carbon nanotube film can be drawn from a carbon nanotube array and then placed on the first adhesive layer 12 directly to cover part or entire surface of the first adhesive layer 12. The carbon nanotube film can be infiltrated into the first adhesive layer 12 after being placed on the first adhesive layer 12. In one embodiment, part of the carbon nanotube film is infiltrated into the first adhesive layer 12, and part of the carbon nanotube film is exposed through of the first adhesive layer 12. Furthermore, a step of pressing the carbon nanotube film can be performed after step (S11) to allow more carbon nanotubes of the carbon nanotube film to infiltrate into the first adhesive layer 12. In one embodiment, a single carbon nanotube film is placed on part surface of the first adhesive layer 12 with the carbon nanotubes substantially extending along the Y direction to form a plurality of first conductive channels on a first surface of the first adhesive layer 12 along the Y direction. Each carbon nanotube of the carbon nanotube film has a first portion infiltrated into the first adhesive layer 12 and a second portion exposed through of the first adhesive layer 12. Also, two or more than two carbon nanotube films can be placed on the first adhesive layer 12 side by side to obtain a greater first carbon nanotube layer 13a. Adjacent sides of the two or more than two carbon nanotube films can be between adjacent two rows or adjacent two columns of the plurality of touch panels 10.

Furthermore, the first adhesive layer 12 is solidified to fix the first carbon nanotube layer 13a. The method for solidifying the first adhesive layer 12 depends on the material of the first adhesive layer 12. The thermoplastic first adhesive layer 12 can be solidified by cooling, the thermosetting first adhesive layer 12 can be solidified by heating, and the UV glue first adhesive layer 12 can be solidified by irradiating with ultraviolet light. Because part of the first carbon nanotube layer 13a is infiltrated into the first adhesive layer 12, the first carbon nanotube layer 13a is fixed by the first adhesive layer 12 during solidifying the first adhesive layer 12. In one embodiment, the first adhesive layer 12 is UV glue layer and solidified by ultraviolet light irradiating for about 2 seconds to about 30 seconds, for example, irradiating for about 4 seconds.

In step (S12), the first carbon nanotube layer 13a can be patterned by a method such as laser-beam etching, ion-beam etching, or electron-beam etching. In one embodiment, a laser beam is controlled by a computer to etch the first carbon nanotube layer 13a and remove redundant carbon nanotubes to obtain ten first transparent conductive layers 15.

In one embodiment, the method for patterning the first carbon nanotube layer 13a includes following steps:

solidifying the first adhesive layer 12 on a area corresponding to the first transparent conductive layers 15 so that the first part of the first carbon nanotube layer 13a corresponding to the first transparent conductive layers 15 is fixed, and the second part of the first carbon nanotube layer 13a not corresponding to the first transparent conductive layers 15 is not fixed; and removing the second part of the first carbon nanotube layer 13a.

In the process of solidifying the first adhesive layer 12, the first adhesive layer 12 is UV glue layer and irradiated with ultraviolet light through a mask.

In the process of removing the second part of the first carbon nanotube layer 13a, the second part of the first carbon nanotube layer 13a is not fixed and can be removed easily by a method such as stripping by an adhesive tape or peeling by a roller having an adhesive outer surface. Because the bonding force between the non-fixed carbon nanotube layer and the solidified adhesive layer is weak, the non-fixed carbon nanotube layer will be removed easily by the adhesive tape or the roller having an adhesive outer surface.

In step (S13), the method for making the second adhesive layer 14 is the same as the method for making the first adhesive layer 12. The size of the second adhesive layer 14 is smaller than the size of the first adhesive layer 12 so that each of the plurality of first transparent conductive layers 13 has at least part exposed.

In one embodiment, the second adhesive layer 14 is a continuous UV glue layer with a thickness of 15 micrometers. The plurality of first transparent conductive layers 13 are arranged to form two rows along the X direction. The second adhesive layer 14 is rectangular and extends along the X direction. The length of the second adhesive layer 14 along the X direction is the same as the length of the first adhesive layer 12 along the X direction. The width of the second adhesive layer 14 along the Y direction is smaller than the width of the first adhesive layer 12 along the Y direction so that one side of each of the plurality of first transparent conductive layers 13 that parallel with the X direction is exposed. The carbon nanotubes of the first transparent conductive layer 13 form a plurality of conductive channels along the Y direction, and each of the plurality of conductive channels has at least part exposed. In anther embodiment, a single second adhesive layer 14 can be formed corresponding to each row or each column of the plurality of first transparent conductive layers 13, and the single second adhesive layer 14 cover only part of the corresponding row or column of the plurality of first transparent conductive layers 13.

In step (S14), the method for making the second carbon nanotube layer 15a and solidifying the second adhesive layer 14 is the same as the method for making the first carbon nanotube layer 13a and solidifying the first adhesive layer 12. In one embodiment, a single carbon nanotube film is placed on part surface of the second adhesive layer 14 with the carbon nanotubes substantially extending along the X direction.

In step (S15), the method for patterning the second carbon nanotube layer 15a is the same as the method for patterning the first carbon nanotube layer 13a. In one embodiment, a laser beam is controlled by a computer to etch the second carbon nanotube layer 15a and remove redundant carbon nanotubes to obtain ten second transparent conductive layers 15.

In step (S16), the plurality of first electrodes 16, the first conductive trace 17, the plurality of second electrodes 18 and the second conductive trace 19 can be made by the same process one time contemporaneously. The plurality of first electrodes 16, the first conductive trace 17, the plurality of second electrodes 18 and the second conductive trace 19 can be can be made of material such as metal, carbon nanotube, conductive silver paste, or transparent conductive oxide (TCO), and can be made by etching a metal film, etching an TCO film, or printing a conductive silver paste. The plurality of first electrodes 16 can be entirely formed on the surface of the first adhesive layer 12, entirely formed on the surface of the first transparent conductive layer 13, or have a part formed on the surface of the first adhesive layer 12 and the other part formed on the surface of the first transparent conductive layer 13. The first conductive trace 17 is formed only on the surface of the first adhesive layer 12. The plurality of second electrodes 18 can be entirely formed on the surface of the second adhesive layer 14, entirely formed on the surface of the second transparent conductive layer 15, or have a part formed on the surface of the second adhesive layer 14 and the other part formed on the surface of the second transparent conductive layer 15. The second conductive trace 19 is formed only on the surface of the second adhesive layer 14.

In one embodiment, the plurality of first electrodes 16, the first conductive trace 17, the plurality of second electrodes 18 and the second conductive trace 19 are made of conductive silver paste and made by screen printing conductive silver paste at the same process one time contemporaneously. The conductive silver paste can include about 50% to about 90% (by weight) of the metal powder, about 2% to about 10% (by weight) of the glass powder, and about 8% to about 40% (by weight) of the binder. At least part of each first electrode 16 is formed on the surface of the first transparent conductive layer 13 and at least part of each second electrode 18 is formed on the surface of the second transparent conductive layer 15. Thus, the first electrode 16 and the second electrode 18 can permeate into the carbon nanotube film before backing and form a composite after backing Because the carbon nanotube film has a plurality of gaps between the carbon nanotubes, the materials of the first electrode 16 and the second electrode 18 can permeate into the carbon nanotube film easily. The plurality of first electrodes 16 are located at one side of the first transparent conductive layer 13 and on a surface of the first adhesive layer 12. The plurality of first electrodes 16 are located along the X direction and spaced from each other. The plurality of first electrodes 16 are electrically connected to the first transparent conductive layer 13. The first conductive trace 17 is electrically connected to the plurality of first electrodes 16. The plurality of second electrodes 18 are located at one side of the second transparent conductive layer 15 and on a surface of the second adhesive layer 14. The plurality of second electrodes 18 are located along the Y direction and spaced from each other. The plurality of second electrodes 18 are electrically connected to the second transparent conductive layer 15, and the second conductive trace 19 is electrically connected to the plurality of second electrodes 18. A plurality of touch panels 10 are obtained after step (S16). The plurality of touch panels 10 are joined together.

Furthermore, a step (S17) of separating each of the plurality of touch panels 10 by cutting can be performed. The cutting can be performed by a laser beam or a mechanical device such as a blade. The blade can move along the row direction firstly and then along the column direction. Thus, the plurality of touch panels 10 are separated from each other. In one embodiment, ten touch panels 10 are obtained by cutting.

The number of the electrodes 16, 18 and the conductive traces 17, 19 are not limited to only three as shown in FIG. 1.

Figure 3:
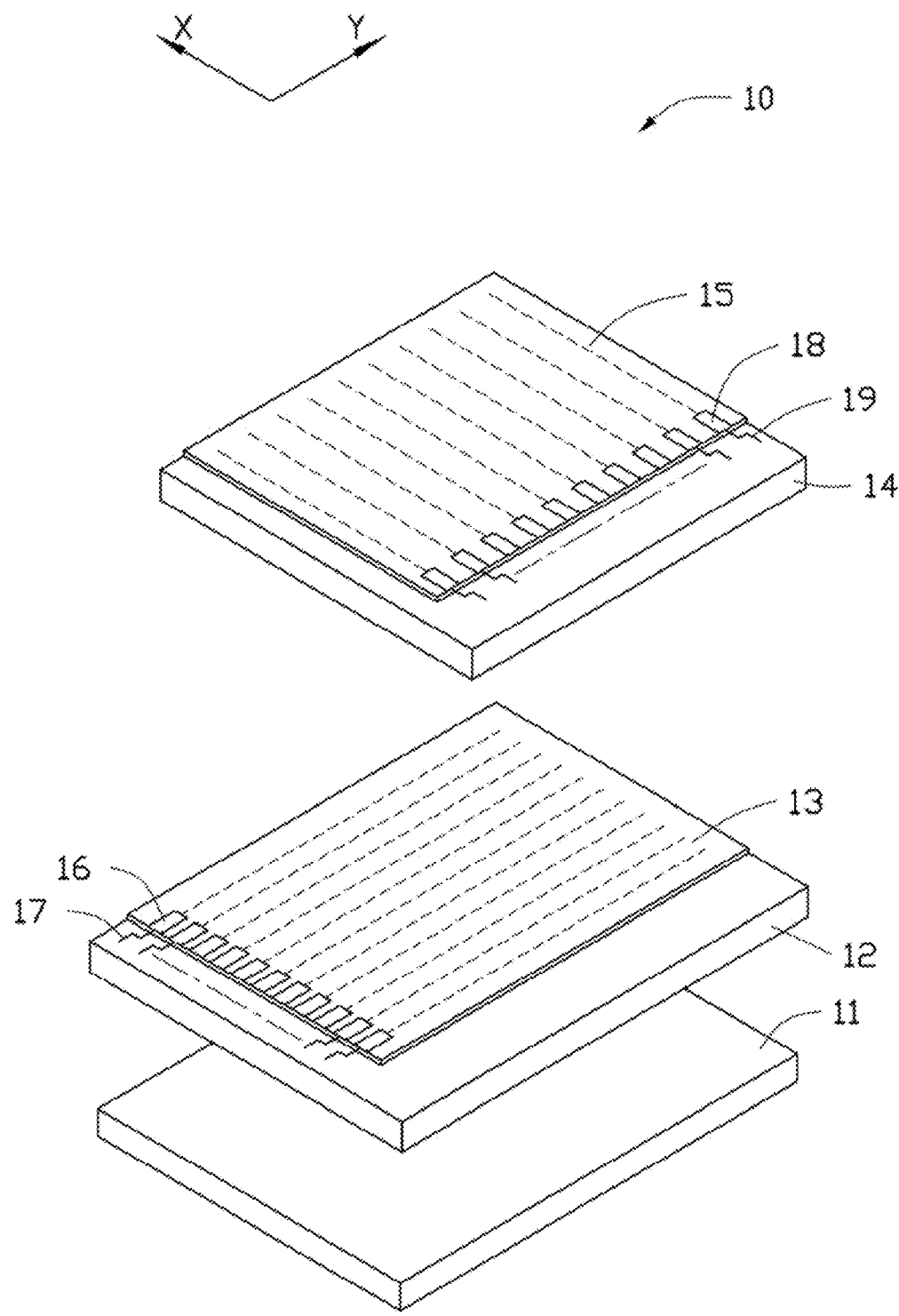
FIG. 3 is a schematic view of one embodiment of a touch panel made by the method of FIG. 1.
Figure 4:
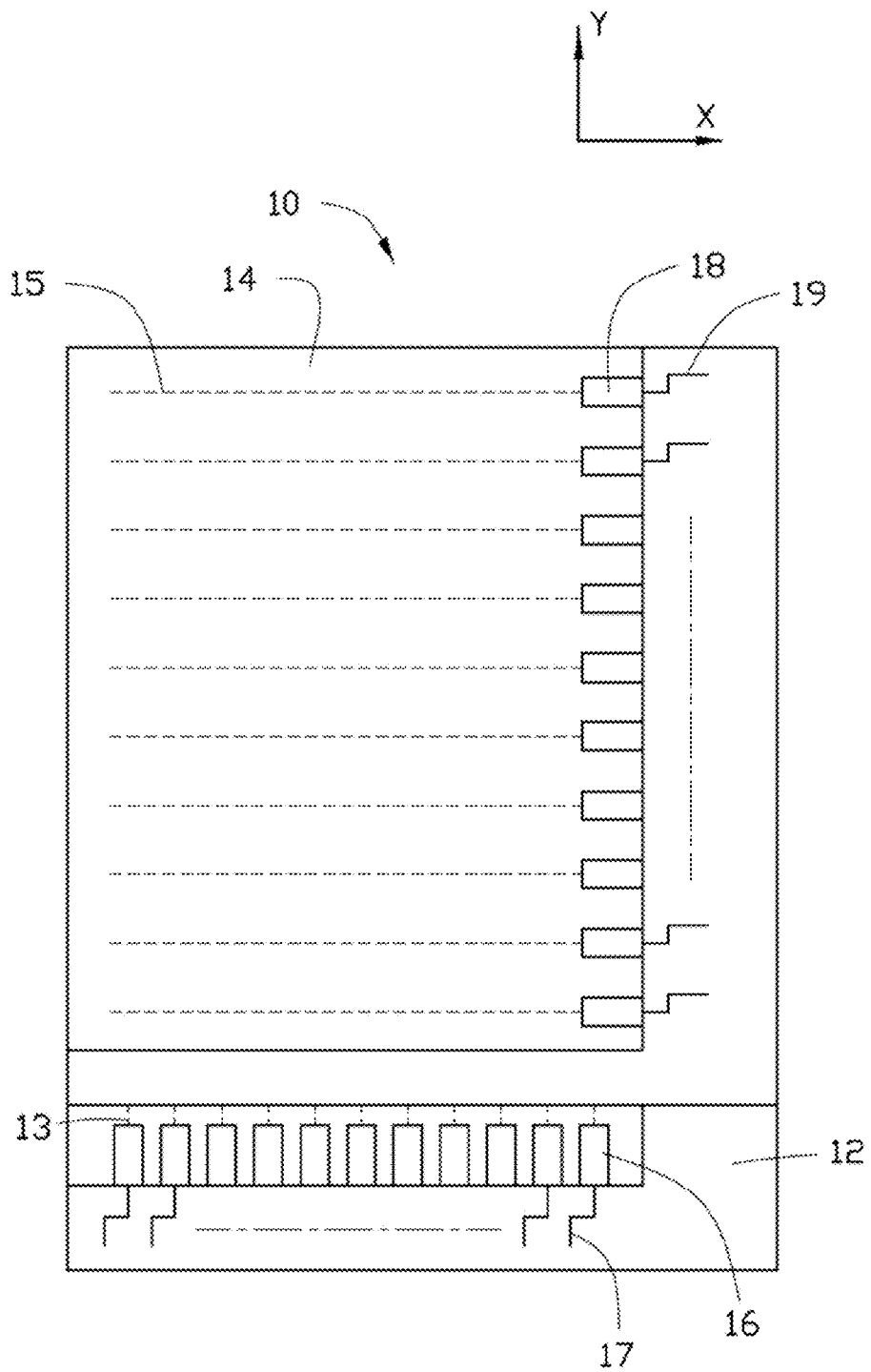
FIG. 4 is a schematic, cross-sectional view, along a line IV-IV of FIG. 3.

Referring to FIGS. 3 and 4, a capacitance-type multi touch panel 10 of one embodiment includes an insulative substrate 11, a first adhesive layer 12 located on a surface of the insulative substrate 11, a first transparent conductive layer 13 located on a surface of the first adhesive layer 12, a second adhesive layer 14 located on a surface of the first transparent conductive layer 13, a second transparent conductive layer 15 located on a surface of the second adhesive layer 14, a plurality of first electrodes 16, a first conductive trace 17, a plurality of second electrode 18, and a second conductive trace 19.

The insulative substrate 11, the first adhesive layer 12, the first transparent conductive layer 13, the second adhesive layer 14, and the second transparent conductive layer 15 are stacked with each other in that order. That is, all the first adhesive layer 12, the first transparent conductive layer 13, the second adhesive layer 14, and the second transparent conductive layer 15 are located on the same side of the insulative substrate 11. Adjacent two of the insulative substrate 11, the first adhesive layer 12, the first transparent conductive layer 13, the second adhesive layer 14, and the second transparent conductive layer 15 are in contact with each other directly. That is, there is no other layer being located between the adjacent two of the insulative substrate 11, the first adhesive layer 12, the first transparent conductive layer 13, the second adhesive layer 14, and the second transparent conductive layer 15. Thus, the touch panel 10 has a decreased thickness. The plurality of first electrodes 16 are located on at least one side of the first transparent conductive layer 13 and electrically connected with the first transparent conductive layer 13. The plurality of first electrodes 16 are also electrically connected with a sensing circuit (not shown) via the first conductive trace 17. The plurality of second electrodes 18 are located on at least one side of the second transparent conductive layer 15 and electrically connected with the second transparent conductive layer 15. The plurality of second electrodes 18 are also electrically connected with a driving circuit (not shown) via the second conductive trace 19. The sensing circuit and the driving circuit can be two printed circuit board (PCB) or integrated in the same PCB.

The second adhesive layer 14 only covers part of the first transparent conductive layer 13 so that the first transparent conductive layer 13 has at least part exposed, and also all the plurality of first electrodes 16 and the first conductive trace 17 are exposed. The plurality of first electrodes 16 are in contact with and electrically connected with the exposed part of the first transparent conductive layer 13. The first transparent conductive layer 13 has at least part exposed includes that the size of the first transparent conductive layer 13 is greater than the size of the second adhesive layer 14. For example, the second adhesive layer 14 is a continuous adhesive layer, and one edge of the first transparent conductive layer 13 is exposed from one side of the second adhesive layer 14. Because the plurality of first electrodes 16 and the first conductive trace 17 not covered by the second adhesive layer 14, the plurality of first electrodes 16, the first conductive trace 17, the plurality of second electrodes 18 and the second conductive trace 19 can be made by the same screen printing process once time. Thus, the method of making the touch panel 10 is simple and cost less. The size of the first transparent conductive layer 13 is greater than the size of the second transparent conductive layer 15. The second transparent conductive layer 15 and the first transparent conductive layer 13 are only partially overlapped with each other. The overlapped part of the second transparent conductive layer 15 and the first transparent conductive layer 13 is defined as the view area of the touch panel 10. The non-overlapped part of the second transparent conductive layer 15 and the first transparent conductive layer 13 is defined as the trace area of the touch panel 10.

In one embodiment, all the shapes of the first adhesive layer 12, the first transparent conductive layer 13, the second adhesive layer 14, and the second transparent conductive layer 15 are rectangular. The length of the second adhesive layer 14 along the Y direction is smaller that the length of the first transparent conductive layer 13 along the Y direction so that part of the first transparent conductive layer 13 is exposed. The width of the second transparent conductive layer 15 along the X direction can be greater than or equal to the width of the first transparent conductive layer 13 along the X direction. The length of the second transparent conductive layer 15 along the Y direction is smaller that the length of the first transparent conductive layer 13 along the Y direction. The width of the second adhesive layer 14 along the X direction is greater than the width of the first transparent conductive layer 13 along the X direction so that the part of the second adhesive layer 14 can be located in the trace area. Thus, the plurality of second electrodes 18 and the second conductive trace 19 can be located on the second adhesive layer 14. The length of the first adhesive layer 12 along the Y direction is greater than the length of the second adhesive layer 14 along the Y direction so that part of the first adhesive layer 12 can be located in the trace area. Thus, the plurality of first electrodes 16 and the first conductive trace 17 an be located on first adhesive layer 12.

Both the first adhesive layer 12 and the second adhesive layer 14 are a layer of solidified electrically insulating glue. The first adhesive layer 12 is used to fix the first transparent conductive layer 13 on the insulative substrate 11. The second adhesive layer 14 is used to bind the first transparent conductive layer 13 and the second transparent conductive layer 15 with each other, and electrically insulate the first transparent conductive layer 13 and the second transparent conductive layer 15 from each other. Because the first transparent conductive layer 13 and the second transparent conductive layer 15 are electrically insulated from each other only by the second adhesive layer 14, the second adhesive layer 14 should have a certain thickness. The thickness of the first adhesive layer 12 can be in a range from about 10 nanometers to about 10 micrometers, for example, from about 1 micrometer to about 2 micrometers. The thickness of the second adhesive layer 14 can be in a range from about 5 micrometers to about 50 micrometers, for example, from about 10 micrometers to about 20 micrometers. The first adhesive layer 12 and the second adhesive layer 14 can be transparent or opaque. The first adhesive layer 12 and the second adhesive layer 14 can be made of materials such as thermal plastic glue, thermosetting glue or UV (Ultraviolet Ray) glue, for example PVC or PMMA. In one embodiment, the first adhesive layer 12 is an UV glue layer with a thickness of 1.5 micrometers and the second adhesive layer 14 is an UV glue layer with a thickness of 15 micrometers. The second adhesive layer 14 covers all the first transparent conductive layer 13, the plurality of first electrodes 16 and the first conductive trace 17.

The solidified electrically insulating glue is different from the widely used insulative layer, such as a previously prepared glass plate, or previously prepared polymer sheet. Usually, the carbon nanotube film is attached on the previously prepared glass plate or polymer sheet, and the glass plate or polymer sheet with the carbon nanotube film thereon is bound with the insulative substrate 11 by OCA. However, it is easy to result a stress difference between the two different insulative substrates during bounding process, which will cause the insulative substrates to be twisted or curled. Furthermore, the previously prepared glass plate or polymer sheet usually has a thickness greater than 100 micrometers, which cause the thickness of the touch panel is increased. If the previously prepared glass plate or polymer sheet has a too small thickness, the difficulty of bounding will be increased greatly. The touch panel 10 only has the second adhesive layer 14 located between the first transparent conductive layer 13 and the second transparent conductive layer 15, which allows the making process to be simplified, and the second adhesive layer 14 have smaller thickness.

Figure 5:
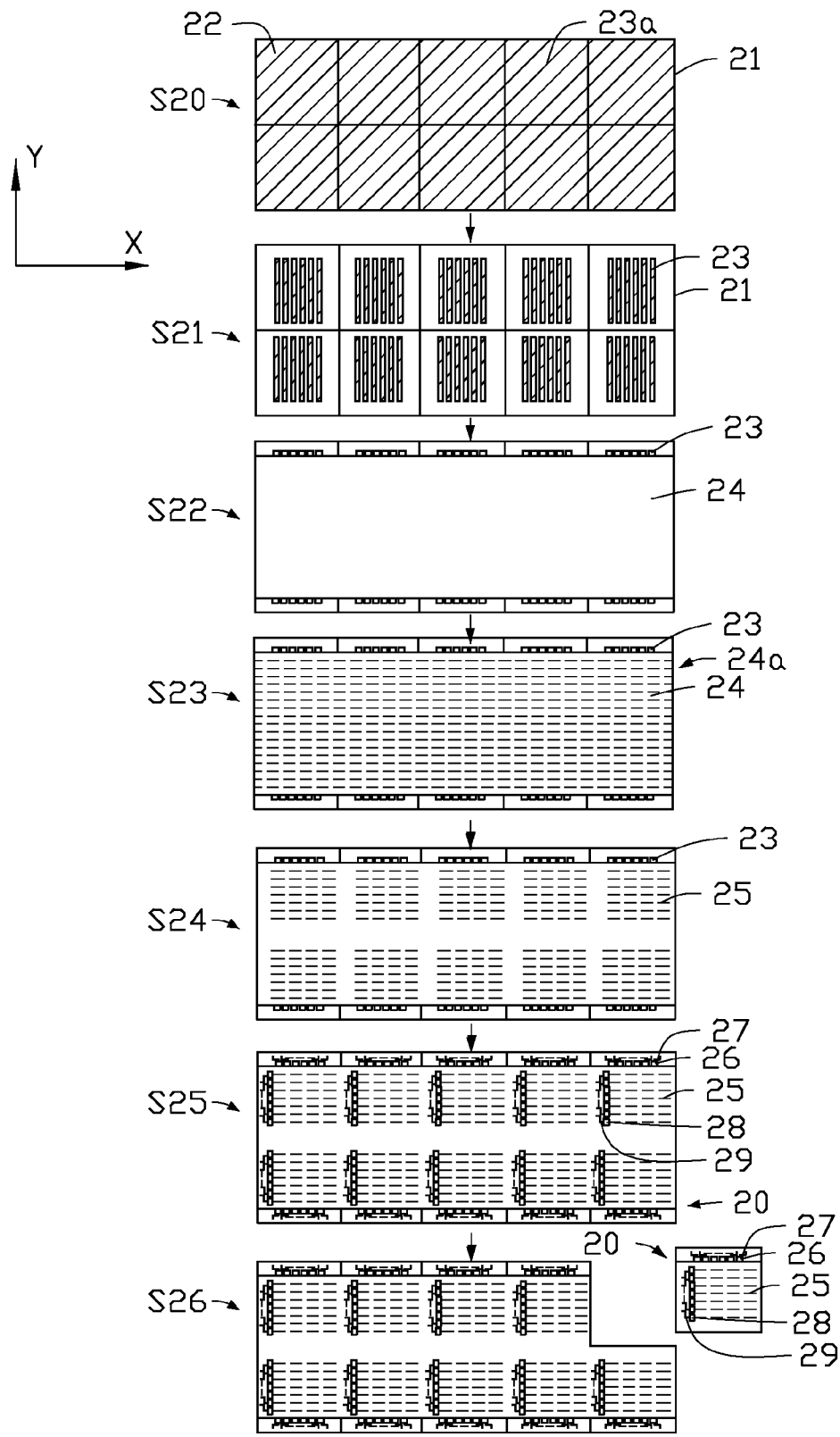
FIG. 5 is a flow chart of the other one embodiment of a method for making a touch panel.

Referring to FIG. 5, a method of one embodiment for making the touch panel 20 comprises following steps:

step (S20), providing an insulative substrate 21 with a TCO layer 23a thereon;

step (S21), patterning the TCO layer 23a to obtain a plurality of first transparent conductive layers 23 spaced from each other, wherein each of the plurality of first transparent conductive layers 13 is a patterned TCO layer;

step (S22), forming a second adhesive layer 24 on the insulative substrate 21 to cover only part of each of the plurality of first transparent conductive layers 23 so that each of the plurality of first transparent conductive layers 23 has at least part exposed;

step (S23), forming a second carbon nanotube layer 25a on a surface of the second adhesive layer 24;

step (S24), patterning the second carbon nanotube layer 25a to obtain a plurality of second transparent conductive layers 25 spaced from each other and with each corresponding to one of the plurality of first transparent conductive layers 23;

step (S25), forming a plurality of first electrodes 26 and a first conductive trace 27 corresponding to each of the plurality of first transparent conductive layers 23; and forming a plurality of second electrode 28 and a second conductive trace 29 corresponding to each of the plurality of second transparent conductive layers 25 contemporaneously; and step (S26), separating each of the plurality of touch panels 20 by cutting.

In step (S20), the insulative substrate 21 is a glass plate with a thickness in a range from about 100 micrometers to about 300 micrometers. The TCO layer 23a defines a plurality of area 22. The material of the TCO layer 23a can be indium tin oxide (ITO), indium zinc oxide (IZO), aluminum zinc oxide (AZO), zinc oxide (ZnO) or tin oxide (TO). In one embodiment, TCO layer 23a is an ITO layer on an ITO glass.

In step (S21), the TCO layer 23a is patterned by laser etching. Each first transparent conductive layer 23 is located in one of the plurality of area 22. The first transparent conductive layer 23 includes a plurality of strap-shaped TCO layers spaced from and in parallel with each other. The plurality of strap-shaped TCO layers extend along the Y direction. The pattern of the first transparent conductive layer 23 is not limited, as long as it can form a conductive film with resistance anisotropy. The thickness, width, and gaps of the plurality of strap-shaped TCO layers can be selected according to need.

Step (S22) to step (26) are the same as the step (S13) to step (17) above. Each of the plurality of strap-shaped TCO layers has one end exposed and electrically connected with one of the plurality of first electrodes 26.

Because the first transparent conductive layer 23 is a patterned TCO layer, the touch panel 20 can omit the first electrodes 26, and the first conductive trace 27 can be in contact with and electrically connected to the patterned TCO layer directly. That is, the plurality of first electrodes 26 and the first conductive trace 27 can be made during the process of laser etching the ITO layer in step (S21).

Figure 6:
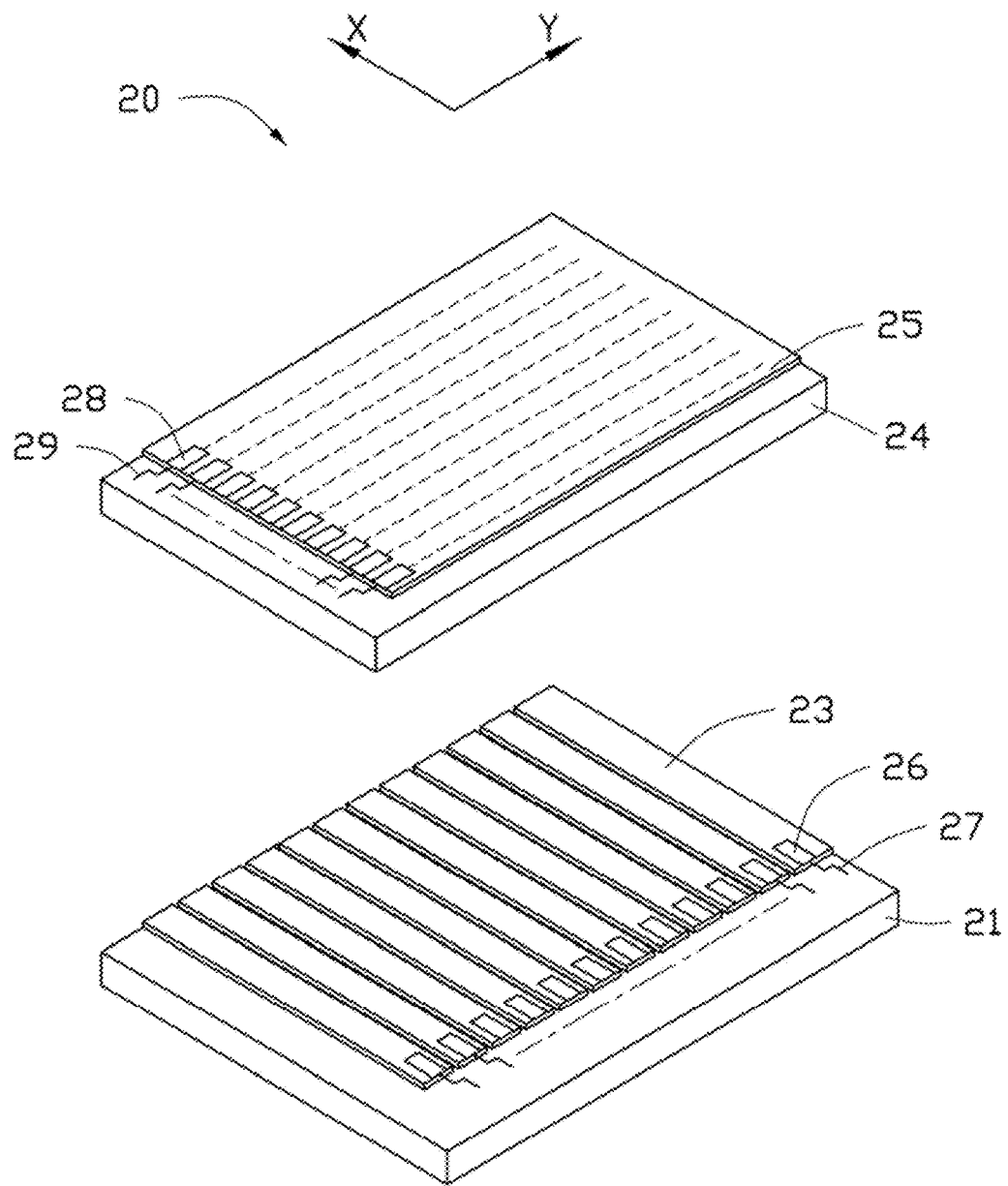
FIG. 6 is a schematic view of the other one embodiment of a touch panel made by the method of FIG. 5.
Figure 7:
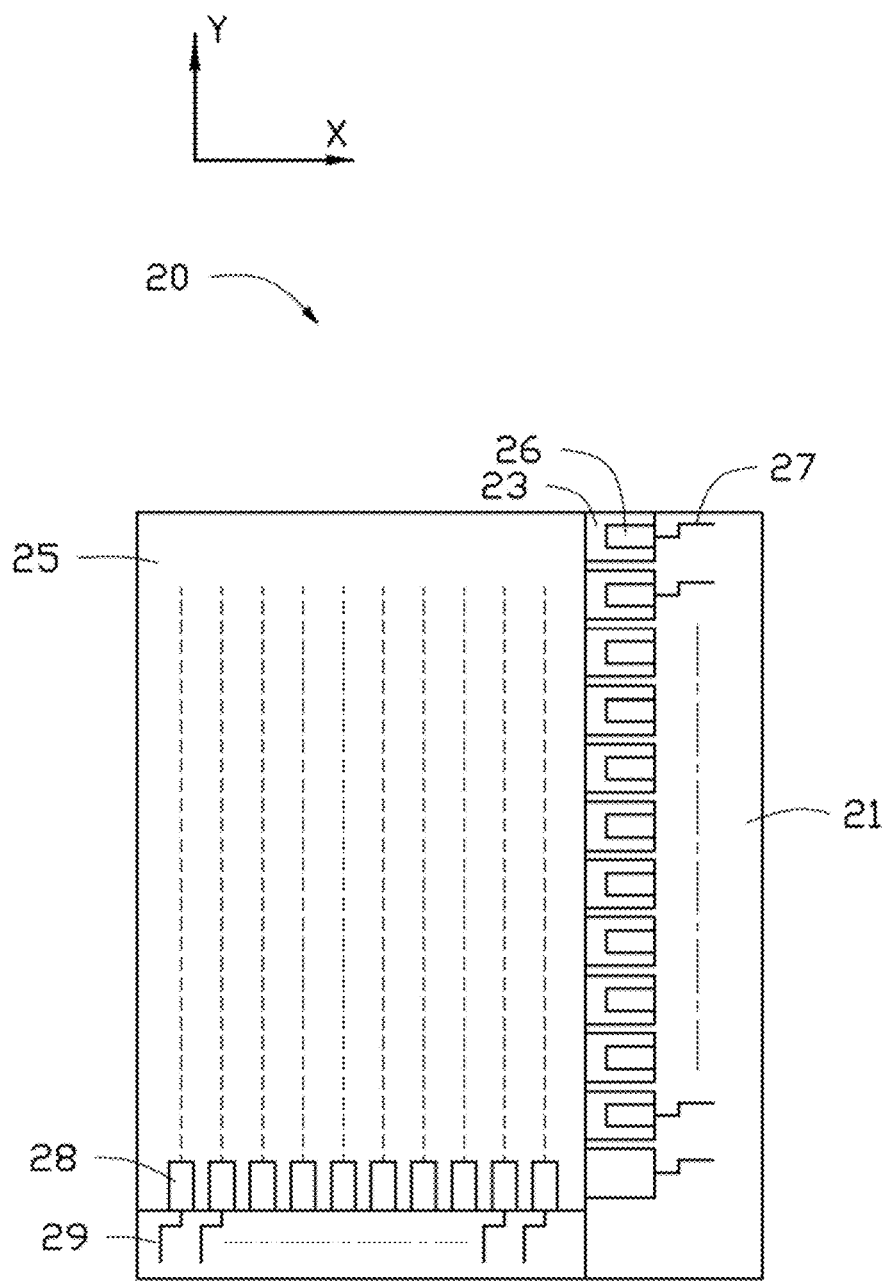
FIG. 7 is a schematic, cross-sectional view, along a line VII-VII of FIG. 6.

Referring to FIGS. 6 and 7, a capacitance-type multi touch panel 20 of one embodiment includes an insulative substrate 21, a first transparent conductive layer 23 located on a surface of the insulative substrate 21, a second adhesive layer 24 located on a surface of the first transparent conductive layer 23, a second transparent conductive layer 25 located on a surface of the second adhesive layer 24, a plurality of first electrodes 26, a first conductive trace 27, a plurality of second electrode 28, and a second conductive trace 29.

The insulative substrate 21, the first transparent conductive layer 23, the second adhesive layer 24, and the second transparent conductive layer 25 are stacked with each other in that order. That is, all the first transparent conductive layer 23, the second adhesive layer 24, and the second transparent conductive layer 25 are located on the same side of the insulative substrate 21. The touch panel 20 is similar as the touch panel 10 except that the first transparent conductive layer 23 is a patterned TCO layer located on a surface of the insulative substrate 21 directly. That is, the touch panel 20 does not have any adhesive layer between the first transparent conductive layer 23 and the insulative substrate 21.

The first transparent conductive layer 23 includes a plurality of strap-shaped TCO layers spaced from and in parallel with each other. The plurality of strap-shaped TCO layers extend along the X direction. The pattern of the first transparent conductive layer 23 is not limited, as long as it can form a conductive film with resistance anisotropy. The thickness, width, and gaps of the plurality of strap-shaped TCO layers can be selected according to need. The material of the TCO layer can be indium tin oxide (ITO), indium zinc oxide (IZO), aluminum zinc oxide (AZO), zinc oxide (ZnO) or tin oxide (TO). In one embodiment, the first transparent conductive layer 23 includes a plurality of strap-shaped ITO layers with each electrically connected to one of the plurality of first electrodes 26.

The second adhesive layer 24 is located on the insulative substrate 21 and covers the entire patterned TCO layer. Part of the second adhesive layer 24 permeates the gaps between the adjacent strap-shaped TCO layers.

Because the first transparent conductive layer 23 is a patterned TCO layer, the touch panel 20 can omit the first electrodes 26. That is the first conductive trace 27 can be in contact with and electrically connected to the patterned TCO layer directly.

Because only the adhesive layer is located between the first transparent conductive layer and the second transparent conductive layer, the touch panel has small thickness, which can meet the requirement of lightweight and small thickness of electronic device development. The touch panel with such structure is easy to fabricate. Furthermore, there is no need to bound two different insulative substrates by an OCA, and the method of making the touch panel is simple and cost less.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a touch panel, the method comprising:
   forming a first adhesive layer on a surface of an insulative substrate;
   forming a first carbon nanotube layer on a surface of the first adhesive layer;
   patterning the first carbon nanotube layer to obtain a plurality of first transparent conductive layers spaced from each other;
   forming a second adhesive layer on the first adhesive layer to cover only part of each of the plurality of first transparent conductive layers so that each of the plurality of first transparent conductive layers has at least a part exposed;
   forming a second carbon nanotube layer on a surface of the second adhesive layer;
   patterning the second carbon nanotube layer to obtain a plurality of second transparent conductive layers spaced from each other and with each of the plurality of the second transparent conductive layers corresponding to one of the plurality of first transparent conductive layers; and
   forming a plurality of first electrodes, a first conductive trace, a plurality of second electrodes, and a second conductive trace contemporaneously, wherein the plurality of first electrodes and the first conductive trace are corresponding to and electrically connected to the plurality of first transparent conductive layers; and the plurality of second electrodes and the second conductive trace are corresponding to and electrically connected to the plurality of second transparent conductive layers.

2. The method of claim 1, wherein a thickness of the first adhesive layer is in a range from about 10 nanometers to about 10 micrometers, and a thickness of the second adhesive layer is in a range from about 5 micrometers to about 50 micrometers.

3. The method of claim 2, wherein the thickness of the first adhesive layer is in a range from about 1 micrometer to about 2 micrometers, and the thickness of the second adhesive layer is in a range from about 10 micrometers to about 20 micrometers.

4. The method of claim 1, wherein each of the first adhesive layer and the second adhesive layer is a layer of thermal plastic glue, thermosetting glue, or ultraviolet ray glue.

5. The method of claim 1, wherein each of the first adhesive layer and the second adhesive layer is formed by spin-coating, spraying, or brushing.

6. The method of claim 1, further comprising solidifying the first adhesive layer after forming the first carbon nanotube layer, and solidifying the second adhesive layer after forming the second carbon nanotube layer.

7. The method of claim 1, wherein the forming the first carbon nanotube layer comprises placing a free-standing first carbon nanotube film on the first adhesive layer directly; and the forming the second carbon nanotube layer comprises placing a free-standing second carbon nanotube film on the second adhesive layer directly.

8. The method of claim 7, wherein the first carbon nanotube film comprises a plurality of first carbon nanotubes substantially extending along an X direction to form a plurality of first conductive channels along the X direction; the second carbon nanotube film comprises a plurality of second carbon nanotubes substantially extending along a Y direction to form a plurality of second conductive channels along the Y direction; the X direction and the Y direction are perpendicular with each other; and each of the plurality of first conductive channels has at least a part exposed.

9. The method of claim 7, wherein the first carbon nanotube film cover entire surface of the first adhesive layer; and the second carbon nanotube film cover entire surface of the second adhesive layer.

10. The method of claim 1, wherein each of the first carbon nanotube layer and the second carbon nanotube layer is patterned by laser-beam etching, ion-beam etching, or electron-beam etching.

11. The method of claim 1, wherein the plurality of first electrodes and the first conductive trace are made of conductive silver paste and made by screen printing the conductive silver paste contemporaneously.

12. The method of claim 1, wherein each of the plurality of first transparent conductive layers has one edge exposed from one side of the second adhesive layer.

13. The method of claim 1, wherein the insulative substrate, the first adhesive layer, the first carbon nanotube layer, the second adhesive layer, and the second carbon nanotube layer are stacked with each other in that order, and adjacent two of the insulative substrate, the first adhesive layer, the first carbon nanotube layer, the second adhesive layer, and the second carbon nanotube layer are in contact with each other directly.

14. The method of claim 1, wherein a plurality of touch panels are obtained after the forming the plurality of first electrodes, the first conductive trace, the plurality of second electrodes, and the second conductive trace, and further comprising separating each of the plurality of touch panels by cutting.

15. A method for making a touch panel, the method comprising:
   forming a plurality of first transparent conductive layers on a surface of an insulative substrate, wherein each of the first transparent conductive layers is resistance anisotropy;
   forming an adhesive layer on the insulative substrate to cover only part of each of the plurality of first transparent conductive layers so that each of the plurality of first transparent conductive layers has at least a part exposed;
   forming a carbon nanotube layer on a surface of the adhesive layer;
   patterning the carbon nanotube layer to obtain a plurality of second transparent conductive layers spaced from each other and with each of the plurality of the second transparent conductive layers corresponding to one of the plurality of first transparent conductive layers; and
   forming a plurality of first electrodes, a first conductive trace, a plurality of second electrodes, and a second conductive trace contemporaneously, wherein the plurality of first electrodes and the first conductive trace are corresponding to and electrically connected to the plurality of first transparent conductive layers; and the plurality of second electrode and the second conductive trace are corresponding to and electrically connected to the plurality of second transparent conductive layers.

16. The method of claim 15, wherein the forming the plurality of first transparent conductive layers comprises providing the insulative substrate with a transparent conductive oxide layer thereon; and patterning the transparent conductive oxide layer.

17. The method of claim 15, wherein the forming the carbon nanotube layer comprises placing a free-standing carbon nanotube film on the adhesive layer directly.

18. The method of claim 17, wherein the free-standing carbon nanotube film is a substantially pure structure consisting of a plurality of carbon nanotubes.

19. The method of claim 18, wherein a majority of the plurality of carbon nanotubes are arranged to substantially extend along a same direction and in parallel with each other, and a minority of the plurality of carbon nanotubes are arranged randomly.

20. The touch panel of claim 15, wherein the first transparent conductive layer and the second transparent conductive layer are electrically insulated from each other only by the adhesive layer.

* * * * *